United States Patent
Mathai et al.

(10) Patent No.: US 10,698,163 B2
(45) Date of Patent: Jun. 30, 2020

(54) POLARIZATION DIVERSITY OPTICAL INTERFACE ASSEMBLY

(71) Applicant: Hewlett Packard Enterprise Development LP, Houston, TX (US)

(72) Inventors: Sagi Mathai, Palo Alto, CA (US); Wayne Victor Sorin, Mountain View, CA (US); Marco Fiorentino, Mountain View, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/175,578

(22) Filed: Oct. 30, 2018

(65) Prior Publication Data

US 2020/0132933 A1 Apr. 30, 2020

(51) Int. Cl.
   *G02B 6/27* (2006.01)
   *G02B 6/126* (2006.01)
   *G02B 6/12* (2006.01)

(52) U.S. Cl.
   CPC .......... *G02B 6/2733* (2013.01); *G02B 6/126* (2013.01); *G02B 6/2773* (2013.01); *G02B 2006/12147* (2013.01)

(58) Field of Classification Search
   CPC .... G02B 6/2733; G02B 6/126; G02B 6/2773; G02B 2006/12147
   USPC .......................................................... 385/37
   See application file for complete search history.

(56) References Cited

U.S. PATENT DOCUMENTS

| 6,421,480 B2 | 7/2002 | Cao |
| 6,466,704 B1 * | 10/2002 | Frisken ................ G02B 6/2713 |
| | | 385/11 |
| 6,859,316 B1 | 2/2005 | Huang et al. |
| 7,068,887 B1 | 6/2006 | Gunn, III et al. |

(Continued)

FOREIGN PATENT DOCUMENTS

| JP | 6227878 | 11/2017 |
| WO | 2002/075377 A1 | 9/2002 |
| WO | 2015/032095 A1 | 3/2015 |

OTHER PUBLICATIONS

Carroll, L. et al.; "Photonic Packaging: Transforming Silicon Photonic Integrated Circuits into Photonic Devices"; Dec. 15, 2016; 69 pages.

*Primary Examiner* — Jerry M Blevins
(74) *Attorney, Agent, or Firm* — Hewlett Packard Enterprise Patent Department

(57) ABSTRACT

Examples herein relate to polarization diversity optical interface assemblies including a single mode optical fiber and first and second grating couplers disposed on a substrate. The first and second grating couplers are coupled to first and second waveguides, respectively. The assemblies further includes an optical connector to couple light between the single mode optical fiber and each of the first and second grating couplers. The optical connector includes a ferrule and a walk-off crystal. The ferrule is coupled to a portion of the single mode optical fiber. The walk-off crystal is configured to spatially separate the light into first and second orthogonal polarization modes prior to passing through the respective first and second grating couplers and/or combine the first and second polarization modes of the light prior to passing through the single mode optical fiber.

20 Claims, 10 Drawing Sheets

(56) References Cited

U.S. PATENT DOCUMENTS

| | | | |
|---|---|---|---|
| 8,854,629 B2 | 10/2014 | Frisken et al. | |
| 9,529,150 B2 | 12/2016 | Orcutt et al. | |
| 2002/0176644 A1* | 11/2002 | Bhagavatula | G02B 6/272 385/11 |
| 2003/0016425 A1* | 1/2003 | Tan | G02B 6/2706 398/204 |
| 2010/0321781 A1* | 12/2010 | Levola | G02B 27/0081 359/569 |
| 2013/0209020 A1* | 8/2013 | Doerr | G02F 1/011 385/2 |
| 2013/0322821 A1* | 12/2013 | Grinderslev | G02B 6/32 385/33 |
| 2016/0091664 A1* | 3/2016 | Doany | G02B 6/34 385/37 |
| 2017/0353262 A1* | 12/2017 | Zheng | H04J 14/0204 |
| 2018/0180815 A1 | 6/2018 | Goodwill et al. | |

* cited by examiner

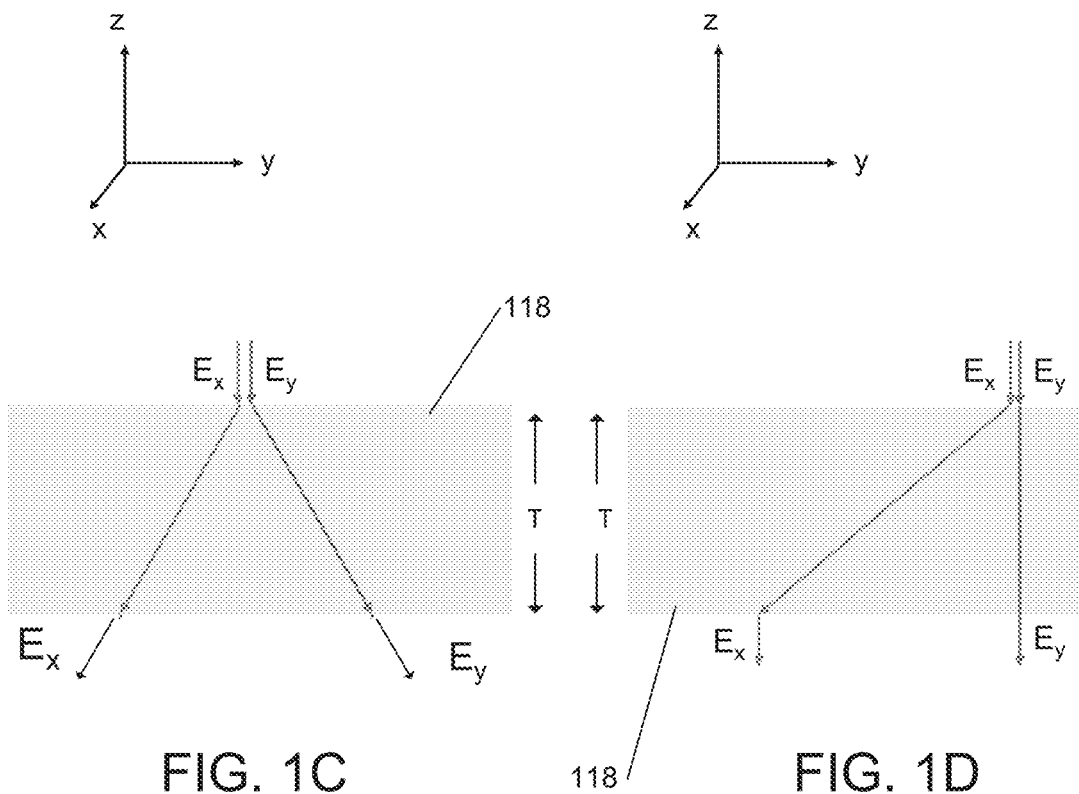

POLARIZATION DIVERSITY OPTICAL INTERFACE ASSEMBLY

STATEMENT OF GOVERNMENT RIGHTS

This invention was made with Government support under Prime Contract No. DE-AC52-07NA27344 awarded by the DOE. The Government has certain rights in this invention.

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Optoelectronic systems or devices such as photonic integrated circuits (PICs) may be used to convert, transmit, or process the optical signals or electronic data. Optical signals may be carried, transmitted, or propagated on or off a board or substrate of the PIC via various transmission media including one or more optical fibers. Efficient coupling of light or optical signals to and from the one or more optical fibers is an important aspect of PIC connector design.

BRIEF DESCRIPTION OF THE DRAWINGS

Certain examples are described in the following detailed description and in reference to the drawings, in which:

FIGS. 1C and 1D illustrate close-up views of examples of the walk-off crystal separating the polarization modes of the single mode optical fiber of FIG. 1A;

DETAILED DESCRIPTION OF SPECIFIC EXAMPLES

Figure 1A:
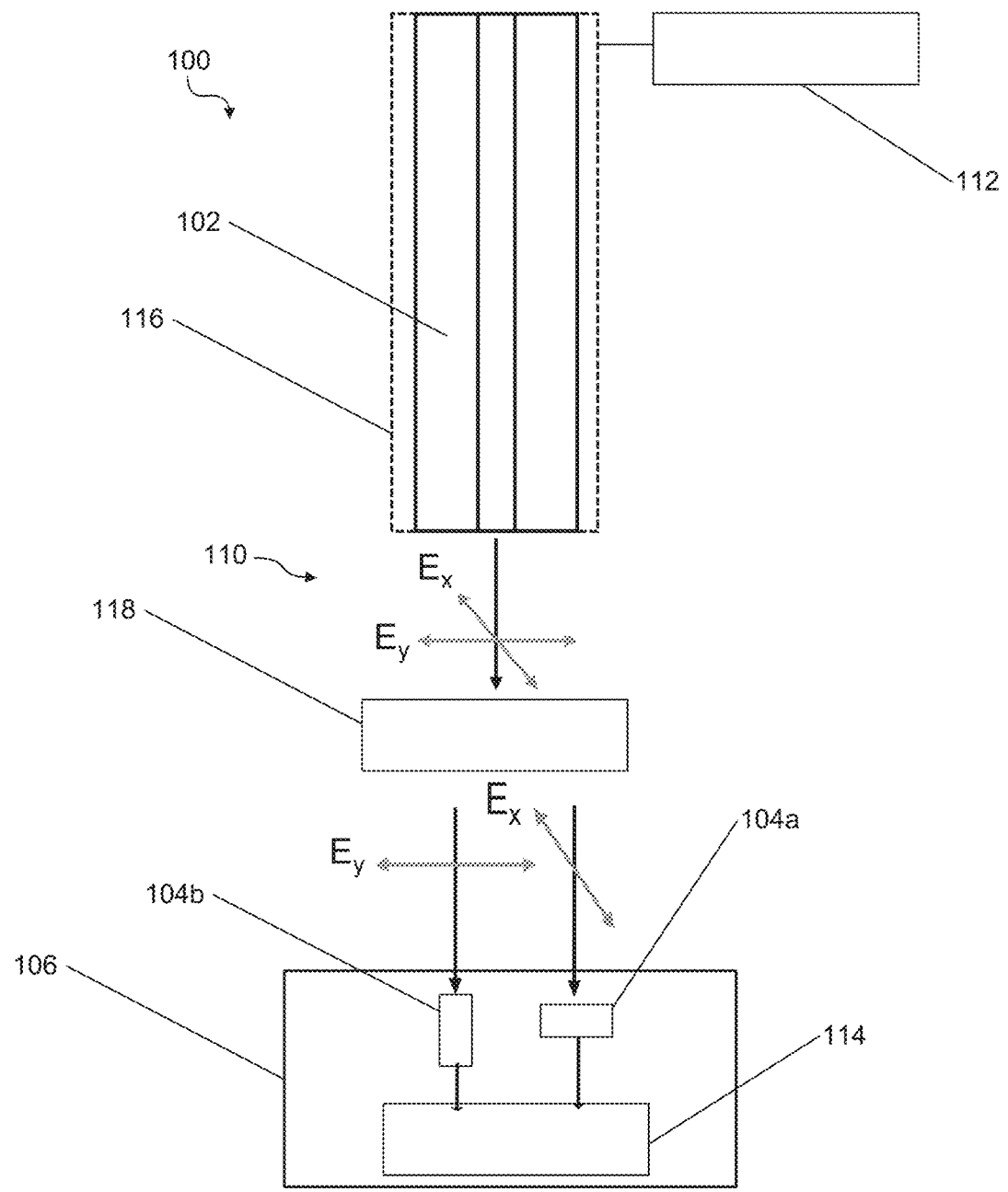
FIG. 1A schematically illustrates an example of a polarization diversity optical interface assembly according to the present disclosure.

Optical fibers may be used to carry or transmit light or optical signals to and from a PIC. Therefore, efficient coupling of light or optical signals to and from the one or more optical fibers is an important aspect of PIC connector design. In particular, single mode optical fibers present unique challenges due to the two orthogonal polarization modes supported by such fibers which should be considered when designing optical connectors between such fibers and the PIC.

While single-mode polarization-maintaining fibers are available, they are generally more costly relative to single mode optical fibers. Additionally, such single mode polarization maintaining fibers may need to be "keyed" to align the transmitted polarization modes at a receiver component. Polarization splitting grating couplers (PSGCs) are also presently available which may be used to couple optical signals from single mode optical fibers to the PIC. However, the coupling efficiency of PSGCs to single mode optical fibers may be poor having peak insertion losses generally greater than about 5 dB. Polarization independent grating couplers may also offer a potential solution. However, design and fabrication of such polarization independent grating couplers remain challenging with respect to achieving wide optical bandwidth and low peak insertion loss.

Typically, single polarization grating couplers are relatively more simple to design and fabricate with wide optical bandwidth and low peak insertion loss (e.g., generally less than about 1.5 dB). Therefore, there remains a need for improvements in efficiently coupling a single mode optical fiber to single polarization grating couplers. A polarization diversity optical interface assembly including a walk-off crystal may be configured to separate the polarization modes of a single mode optical fiber to be coupled to single polarization grating couplers in an efficient manner as described herein. Implementations of the present disclosure provide improved polarization diversity optical interface assemblies and methods thereof to couple light (e.g., optical signals) between a single mode optical fiber and single polarization first and second grating couplers to achieve efficient coupling, low peak insertion loss, or wide optical bandwidth.

FIGS. 1A-1D illustrate an example of a polarization diversity optical interface assembly 100 and components thereof according to the present disclosure. The polarization diversity optical interface assembly 100 includes one or more single mode optical fiber(s) 102, grating couplers 104 (e.g., identified individually as a first grating coupler 104a and a second grating coupler 104b) disposed on a substrate 106, and an optical connector 110 configured to couple light (e.g., optical signals) between the single mode optical fiber 102 and the first and second grating couplers 104a and 104b.

Each of the first and second grating couplers 104a and 104b may be coupled to a waveguide 108 (e.g., identified individually as a first waveguide 108a and a second waveguide 108b, respectively). The grating couplers 104 may each be single polarization grating couplers. The waveguides 108 may each be polarization dependent or sensitive waveguides. The waveguides 108 may transmit light to or from the optical fiber 102. For example, the waveguides 108 may transmit optical signals from the optical fiber 102 across the substrate 106 to an optoelectronic device 114 (e.g., a light emitter, detector, modulator, or optical transceiver) disposed on the substrate 106 to receive, detect, or process such signals. In other implementations, the waveguides 108 may transmit optical signals from the optoelectronic device 114 off or away from the substrate 106 onto the optical fiber 102 (e.g., via the grating couplers 104 and optical connector 110) to be received, detected, or processed by an optoelectronic device disposed off the substrate 106.

In some implementations, waveguides 108a and 108b are integrated or monolithically formed with respective grating couplers 104a and 104b (e.g., a waveguide grating coupler). In other implementations, the waveguides 108 and grating couplers 104 are separately formed.

The single mode optical fiber 102 may also be coupled to an optoelectronic device 112 (e.g., a light emitter, detector, modulator, or optical transceiver) disposed off the substrate 106. In this manner, the optical fiber 102 may transmit light or optical signals from the optoelectronic device 112 onto the substrate 106 (e.g., into the waveguides 108 via the optical connector 110 and grating couplers 104) to be received, detected, or processed by the optoelectronic device 114 disposed on the substrate 106. In other implementations, optical signals may be carried or transmitted off the substrate 106 by the optical fiber 102 from the optoelectronic 114 device disposed on the substrate 106 as described above. The single mode optical fiber 102 may be a single optical fiber or an array of optical fibers.

The optical connector 110 couples light between the single mode optical fiber 102 and each of the first and second grating couplers 104a and 104b. The optical connector 110 includes a ferrule 116 coupled to at least a portion of the single mode optical fiber 102. The optical connector 110 further includes a walk-off crystal 118. The walk-off crystal 118 may spatially separate the light into first and second orthogonal polarization modes (e.g., identified individually as $E_x$ and $E_y$) prior to passing the polarization modes through the respective first and second grating couplers 104a and 104b, combine the first and second polarization modes of the light $E_x$ and $E_y$ (e.g., from the respective first and second grating couplers 104a and 104b) into a single optical output signal prior to passing the light into the single mode optical fiber 102, or both. The optical connector 110 may be a single mode expanded beam optical connector. For example, the optical connector 110 may include a lens 230 coupled to or disposed at an end of the single mode optical fiber 102 to collimate the light exiting or emerging from the single mode optical fiber 102 as described in more detail below (see FIGS. 2A-2E).

Figure 1B:
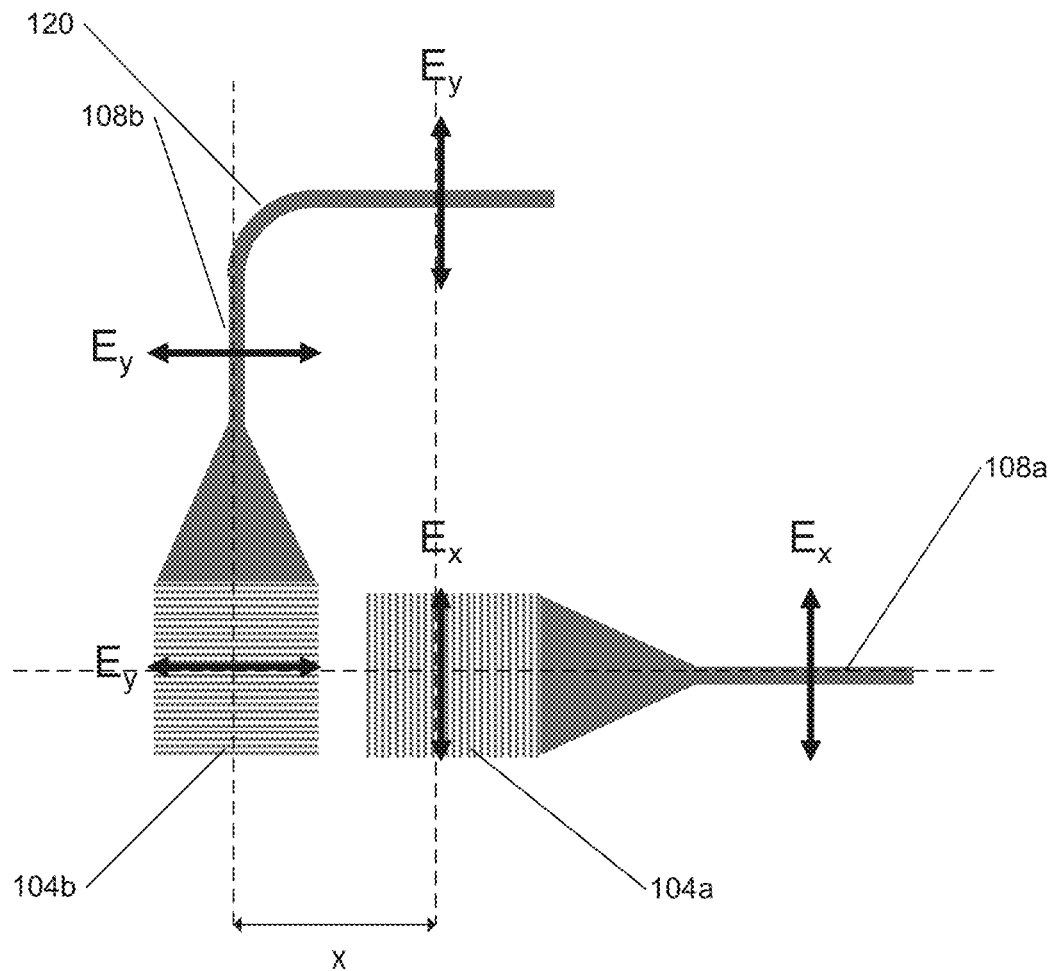
FIG. 1B illustrates a close-up view of an example of the grating couplers of FIG. 1A.

Referring to FIG. 1B, the first and second grating couplers 104a and 104b may extend co-planar with each other. For example, the grating couplers 104 may extend along a same horizontal plane or surface of substrate 106 (e.g., a top or front side or bottom or rear side of substrate 106). In some implementations, the first and second grating couplers 104a and 104b may also extend or be oriented at an angle (e.g., orthogonal or non-oblique) relative to each other to ensure the first and second orthogonal polarization modes propagate in the proper orientations or directions across the grating couplers 104 (e.g., along optical beam axes of the grating couplers). For example, the first grating coupler 104a may extend orthogonally relative to the second grating coupler 104b such that a direction of the light or beam path of the first polarization mode $E_x$ propagates across the first grating coupler 104a in a direction (e.g., east-west direction) orthogonal to a direction (e.g., north-south direction) that the light or beam path of the second polarization mode $E_y$ propagates across the second grating coupler 104b. In other implementations, the optical connector 110 may include one or more lenses or tilt elements 232 (see FIGS. 2A-2E), such as a prism to ensure proper propagation or orientation of the light or beam path from the first and second polarization modes along respective optical beam axes of respective grating couplers 104a and 104b, as described in more detail below.

The light from the first and second polarization modes $E_x$ and $E_y$ may have the same polarization or orientation once they are in their respective waveguides 108 (e.g., waveguides 108 may have one or more turns or bends 120 such that the polarizations or beam path directions are the same or parallel). In some implementations, ends of the grating couplers 104 may be spaced apart as illustrated.

Referring to FIGS. 1C-1D and as described above, the walk-off crystal 118 spatially separates or combines the first and second polarization modes of the light $E_x$ and $E_y$. The walk-off crystal 118 may provide angular walk-off (FIG. 1C) or position walk-off (FIG. 1D) to separate (or combine) the polarization modes. The walk-off crystal 118 may be constructed from a birefringent crystal such as $TiO_2$ or $YVO_4$. The degree or amount of angular or position walk-off 118 (e.g., between 5 and 10 degrees or between 0.1 to 0.2 radians) may be achieved by cutting or shaping the walk-off crystal 118 at a desired angle, orienting the walk-off crystal 118 relative to incoming or outgoing light, or orienting incoming or outgoing light with respect to a crystal optic axis of the walk-off crystal 118 to have a desired angle of incidence. In some implementations, the walk-off crystal 118 may include only a single crystal. In other implementations, the walk-off crystal 118 may include two or more crystals.

In some implementations, a thickness T of the walk-off crystal 118 is selected such that a walk-off distance between the first and second polarization modes of the light $E_x$ and $E_y$ matches a spacing X (e.g., FIG. 1B) between optical axes of grating couplers 104. In other implementations, a thickness of walk-off crystal 118 is selected such that a walk-off distance between the first and second polarization modes of the light $E_x$ and $E_y$ matches a spacing between axes of lenses (e.g., lenses 232) configured to tilt or focus the light onto the grating couplers 104. In some implementations, the walk-off crystal 118 has a thickness between 1 mm to 2.5 mm which may provide or correspond to a walk-off distance between 100 microns to 250 microns between the first and second polarization modes of the light $E_x$ and $E_y$.

Referring back to FIG. 1A, the substrate 106 may serve as a foundation or common carrier for various electronic and optical components of a PIC including the grating couplers 104a and 104b in which light is coupled from the single mode optical fiber 102 by the optical connector 110. In some implementations, the substrate 106 is constructed out of silicon, thus providing a silicon photonics platform. In some implementations, the substrate 106 includes a silicon photonic interposer on which the various electronic and optical components may be disposed. The substrate 106 may include multiple layers (e.g., semiconductor, dielectric, or insulating layers). For example, the substrate 106 may include an insulating layer sandwiched between semiconductor layers. The substrate 106 may be a silicon-on-insulator (SOI), a silicon-on-glass, silicon on sapphire, or silicon on nothing substrate. In some implementations, the substrate 106 includes an insulating layer such as a buried oxide (BOX) layer composed of silicon dioxide or other insulating oxide material. For example, the grating couplers 104a and 104b may be disposed on the BOX layer with the BOX layer disposed over or on a base silicon substrate layer of the substrate 106. In other implementations, the insulating layer may be composed of another insulating material such as sapphire, diamond, or glass.

With reference to FIGS. 2A-2E, examples of various polarization diversity optical interface assemblies 200a-200e are illustrated according to the present disclosure with a walk-off crystal positioned at various locations along the optical path or train relative the other components. The polarization diversity optical interface assemblies 200a-200e may include one or more of any of the features described herein with respect to the polarization diversity optical interface assembly 100 or with respect to one another, in whole or in part. For example, the polarization diversity optical interface assemblies 200a-200e may include the single mode optical fiber 102, grating couplers 104 and waveguides 108 disposed on a substrate 106, optoelectronic devices 112 or 114 disposed on or off the substrate 106, or optical connector 110 with ferrule 116 as described herein.

Figure 2A:
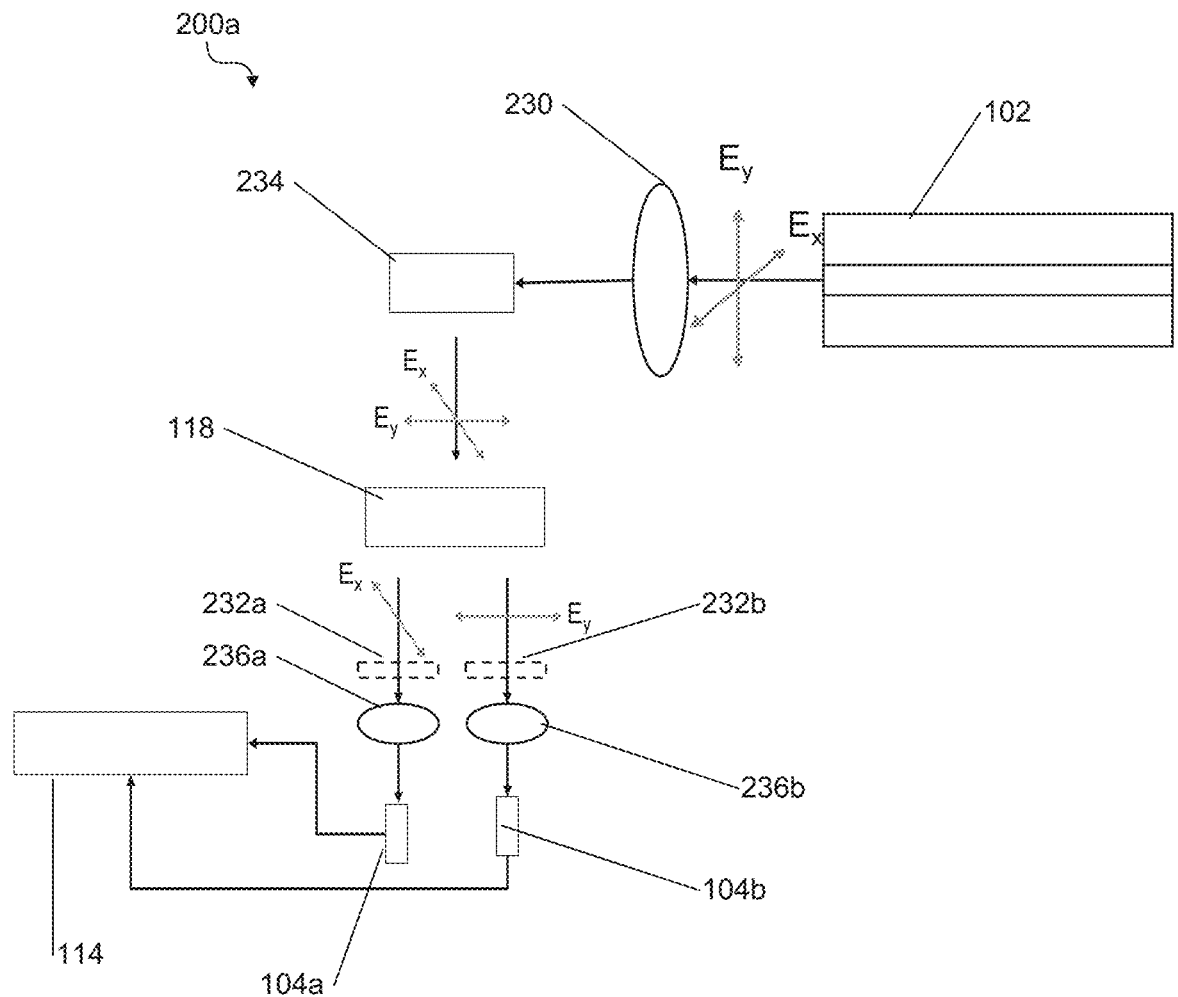
FIG. 2A schematically illustrates another example of a polarization diversity optical interface assembly according to the present disclosure.

As illustrated in FIG. 2A, the polarization diversity optical interface assembly 200a includes the lens 230 to collimate light exiting the single mode optical fiber 106 (or focus light entering the single mode optical fiber 106). An optical turning element 234 (e.g., internal reflection mirror, parabolic turning mirror) may be used to turn the light to a proper orientation relative to the crystal optic axis of the walk-off crystal 118 such that a desired walk-off between the polarization modes of the light is achieved. In this manner, the walk-off crystal 118 is disposed after the optical turning element 234 along the optical path. In other implementations, as described in more detail below, the walk-off crystal 118 may be positioned or disposed at other various locations along the optical path or train between the single mode optical fiber 102 and the grating couplers 104 (e.g., before the optical turning element 234, within the ferrule 116, outside the ferrule 116, disposed on the substrate 106, between the one or more lenses 236 and the grating couplers 104).

After exiting the walk-off crystal 118, the first and second polarization modes of the light $E_x$ and $E_y$ may be tilted or oriented to ensure the modes propagate along optical axes of the respective grating couplers 104a and 104b. For example, the polarization diversity optical interface assembly 200a may include one or more light tilting lenses or elements 232 identified individually as 232a and 232b (e.g., beam tilting prisms). In other implementations, the polarization diversity optical interface assembly 200a may include one or more lenses 236 identified individual as 236a and 236b (e.g., disposed, mounted, or established on the substrate 106) instead of or in addition to the tilting elements 232. The one or more lenses 236 may be spherical or aspherical lenses.

The one or more lenses 236 may focus, tilt, or focus and tilt the first and second polarization modes of the light $E_x$ and $E_y$ onto the grating couplers 104a and 104b such that light propagates along the optical axes of the respective grating couplers. As described above, the light may then enter respective waveguides 108a and 108b to be carried to optoelectronic device 114 disposed on the substrate 106 to be further processed. For example, the light may be carried to a data modulation system, polarization diversity circuit, or other photonic integrated circuit.

Figure 2B:
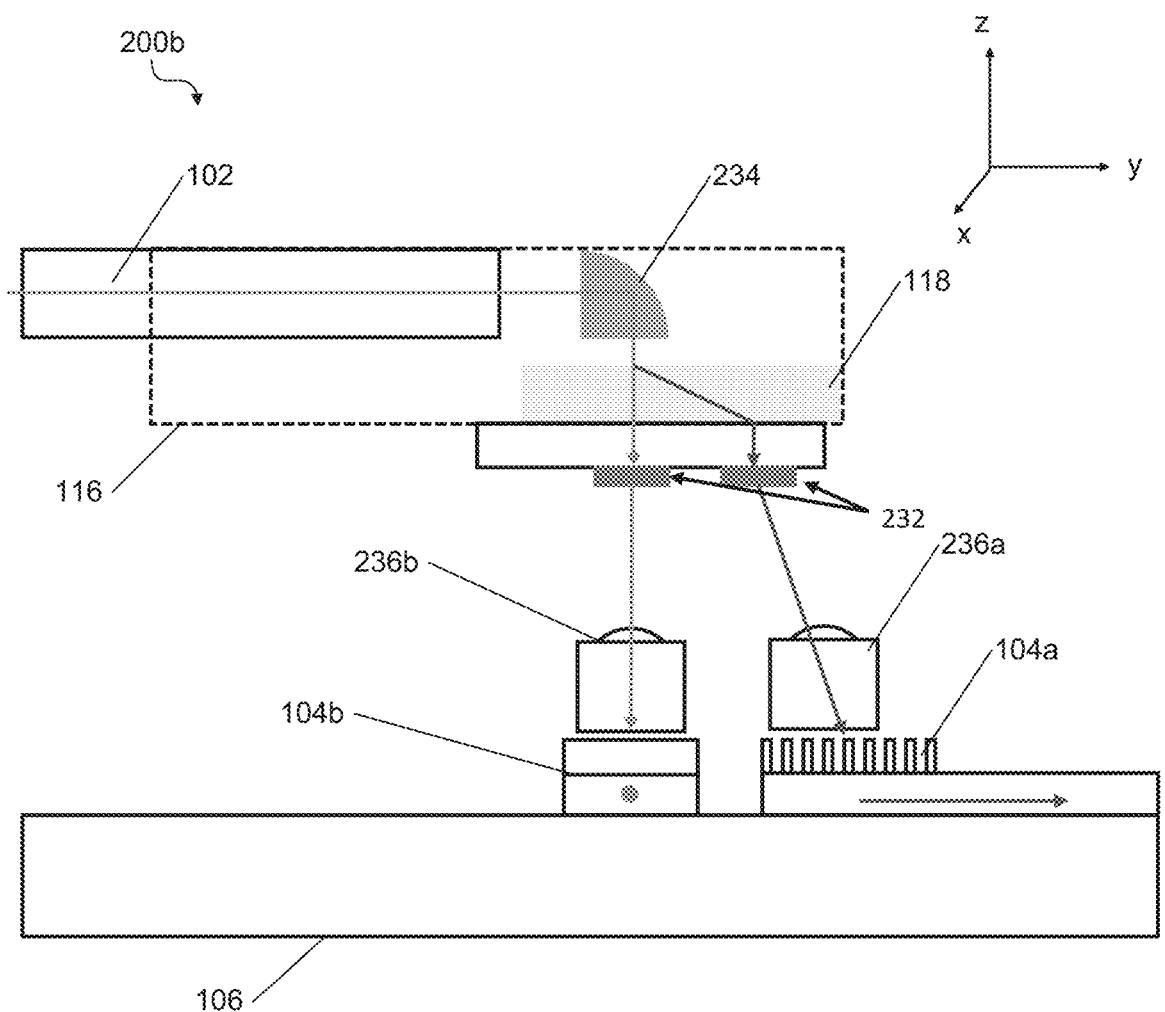
FIG. 2B illustrates another example of a polarization diversity optical interface assembly according to the present disclosure.

With reference to FIG. 2B, as illustrated, the walk-off crystal 118 of polarization diversity optical interface assembly 200b may be positioned within the ferrule 116. In this implementation, the walk-off crystal 118 is positioned or disposed after the optical turning element 234 similar to polarization diversity optical interface assembly 200a. After the light is spatially separated into the first and second polarization modes of the light $E_x$ and $E_y$, first and second tilting elements 232 disposed on or coupled to the ferrule 116 may tilt or orient the respective light paths of each mode such that they propagate in proper directions (e.g., east-west and north-south when the grating couplers are orthogonal to each other) along optical axes of grating couplers 104 as described above. In some implementations, as illustrated, the first polarization mode is tilted about an x-axis while the second polarization mode is tilted about a y-axis prior to entering respective grating couplers 104a and 104b (e.g., at the optimum angle of incidence). In some implementations, the tilted first and second polarization modes of the light $E_x$ and $E_y$ may then pass through respective lenses 236a and 236b to be focused onto the grating couplers 104a and 104b (e.g., to ensure mode matching to the grating coupler and they reach the grating couplers at the optimum angle of incidence). The lenses 236a and 236b may be mounted on the substrate 106.

Figure 2C:
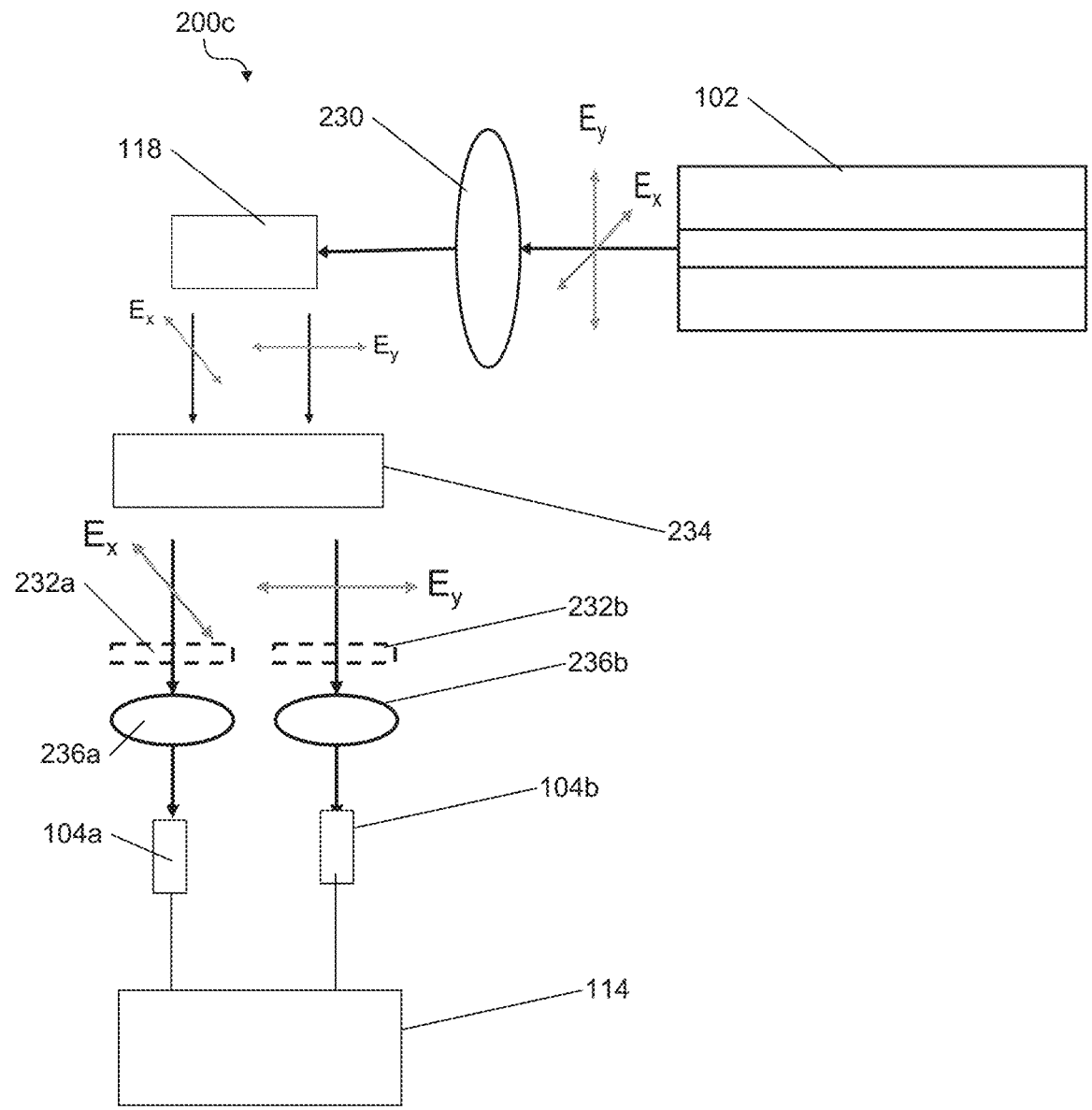
FIG. 2C schematically illustrates another example of a polarization diversity optical interface assembly according to the present disclosure.

With reference to FIG. 2C, as illustrated, the walk-off crystal 118 of polarization diversity optical interface assembly 200c may be positioned within the ferrule 116 before the optical turning element 234 such that the first and second polarization modes of the light $E_x$ and $E_y$ are spatially separated along the optical path prior to being turned by the optical turning element 234.

Figure 2D:
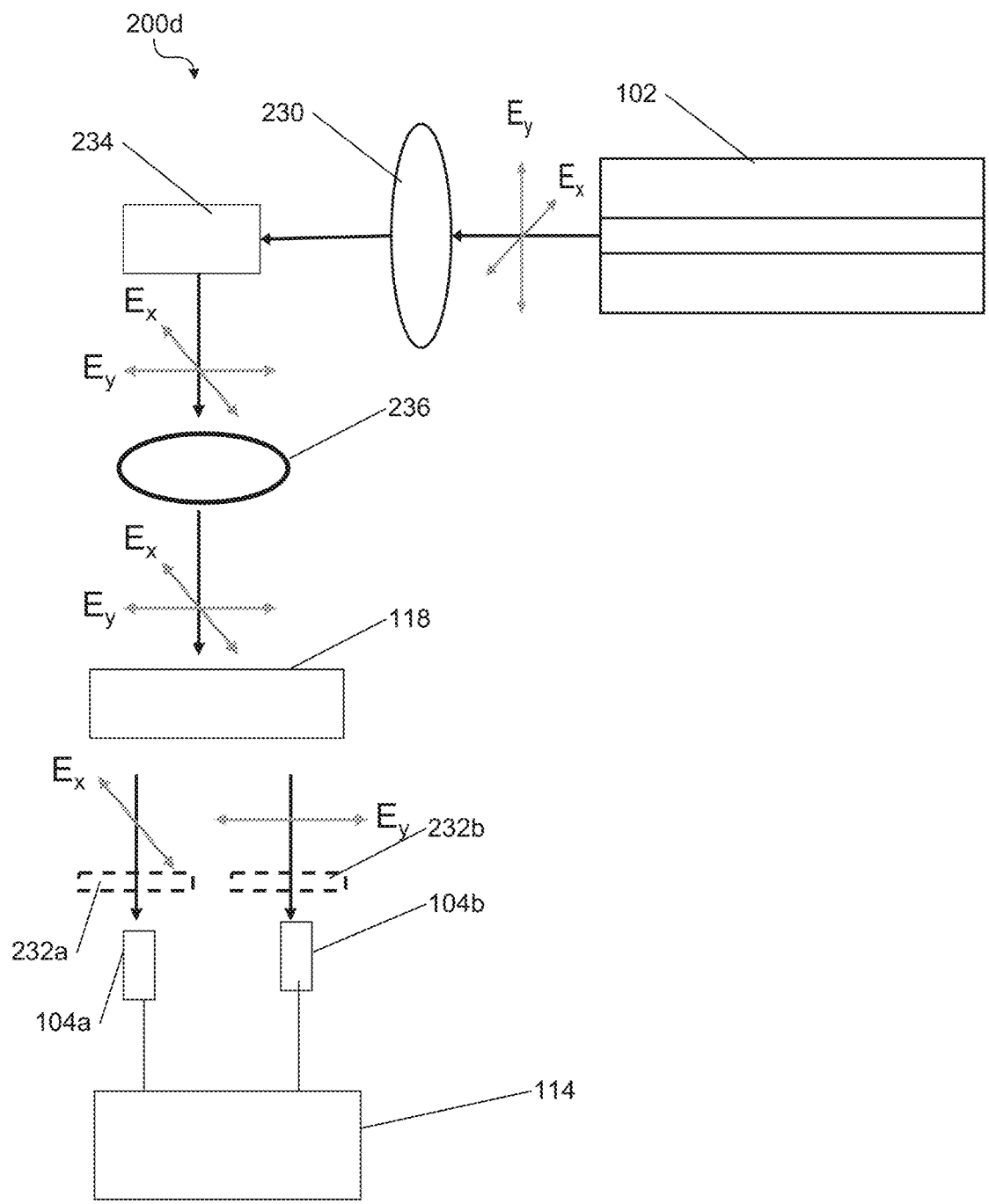
FIG. 2D schematically illustrates another example of a polarization diversity optical interface assembly according to the present disclosure.

In some implementations, the walk-off crystal 118 may be positioned or disposed outside or off of the ferrule 116. For example, as illustrated in FIG. 2D, the walk-off crystal 118 of polarization diversity optical interface assembly 200d may be positioned between one or more lenses 236 and grating couplers 104a and 104b. The walk-off crystal 118 may be established or disposed on the substrate 106. The one or more lenses 236 may be disposed on the substrate 106 or coupled to the ferrule 116. The polarization diversity optical interface assembly 200d may further includes one or more tilting elements 232 as described herein between the walk-off crystal 118 and the grating couplers 104a and 104b.

Figure 2E:
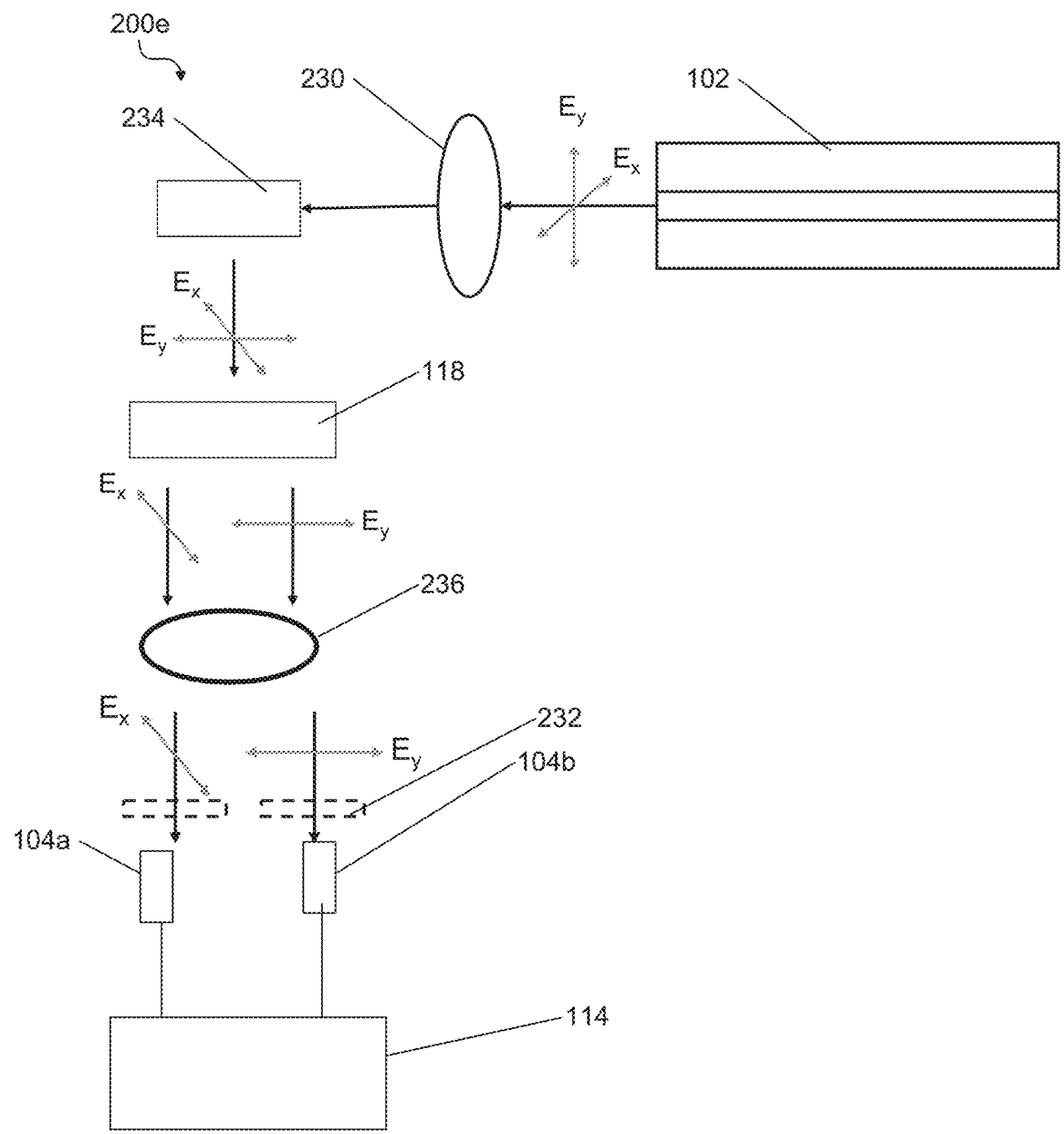
FIG. 2E schematically illustrates another example of a polarization diversity optical interface assembly according to the present disclosure.

With reference to FIG. 2E, in some implementations, the polarization diversity optical interface assembly 200e includes a single lens 236 disposed after the walk-off crystal 118 to focus or orient the first and second polarization modes of the light $E_x$ and $E_y$ onto and along optical axes of the grating couplers 104a and 104b. In some implementations, the polarization diversity optical interface assembly 200e may further include tilting elements 232 to further ensure that the first and second polarization modes of the light $E_x$ and $E_y$ propagate along the optical axes of grating couplers 104a and 104b. The walk-off crystal 118 may be disposed at any of the locations as described herein.

Figure 3:
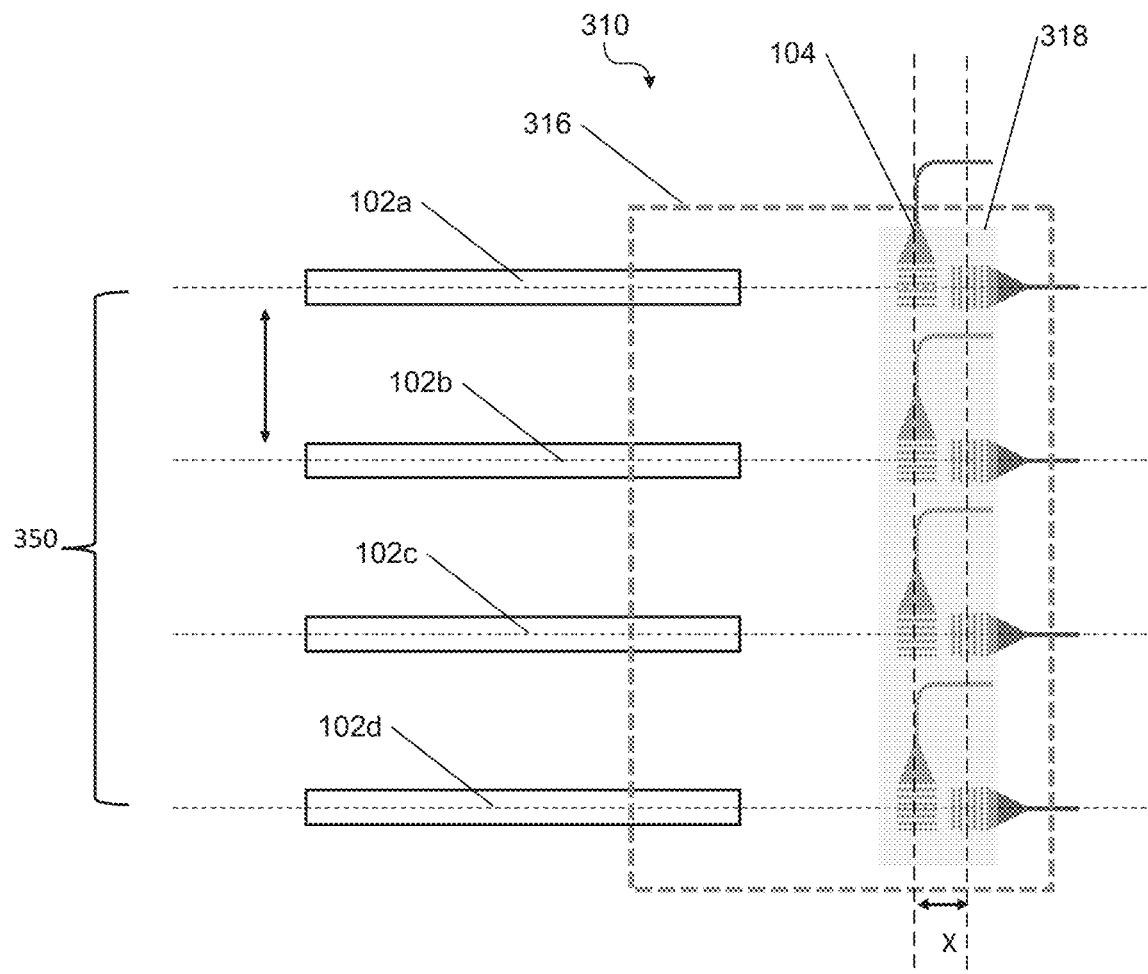
FIG. 3 schematically illustrates yet another example of a polarization diversity optical interface assembly according to the present disclosure.

With reference to FIG. 3, any of the polarization diversity optical interface assemblies described herein (e.g., may include an optical connector 310 with a ferrule 316 configured to carry or couple to an array 350 of single mode optical fibers 102a-102d. As illustrated, the walk-off crystal 318 may extend across the entire array 350 to spatially separate the light from each fiber 102 into first and second polarization modes prior to passing through pairs of corresponding grating couplers 104. In other implementations, multiple spaced apart walk-off crystals 318 may be located between each fiber 102a-102d and grating couplers.

Figure 4:
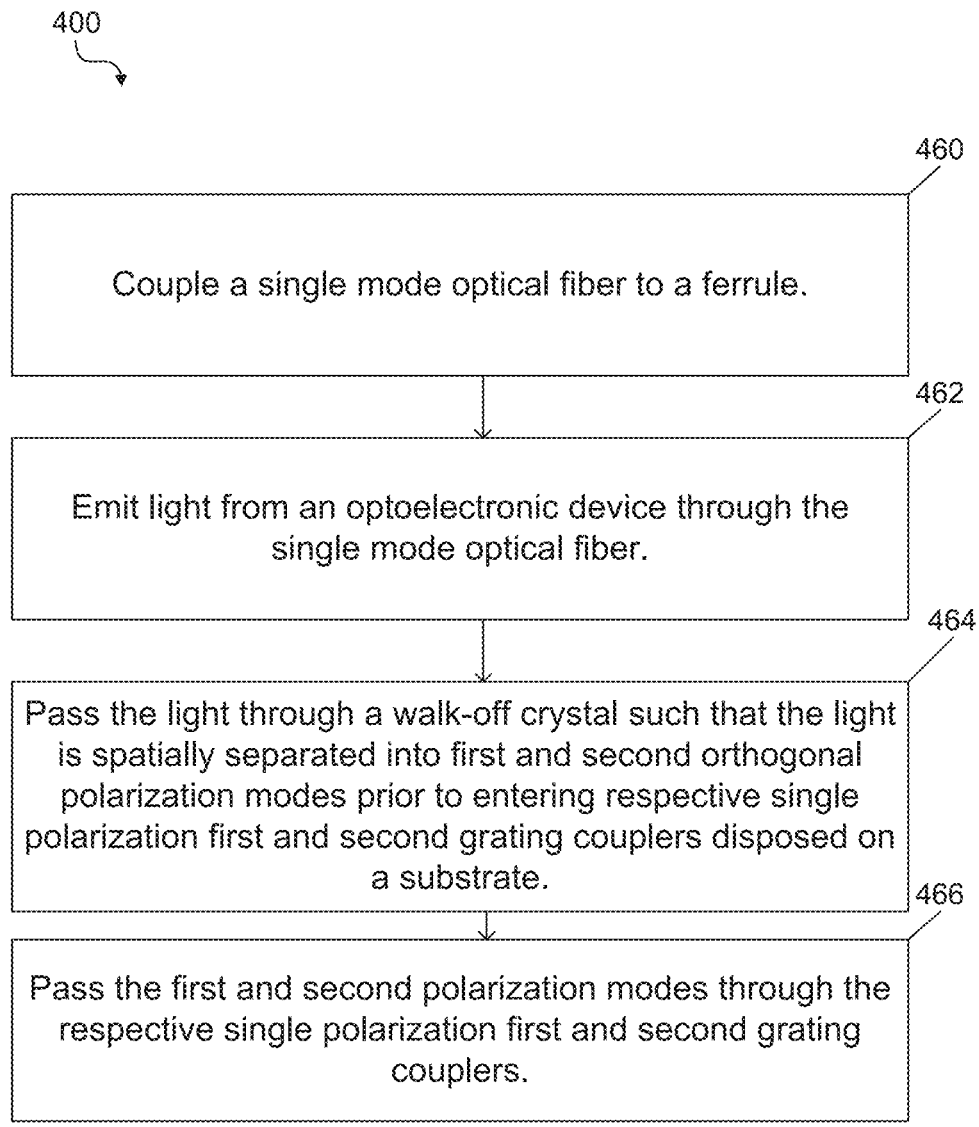
FIG. 4 is a flowchart schematically illustrating an example method of coupling light between a single mode optical fiber and single polarization first and second grating couplers with a polarization diversity optical interface assembly according to the present disclosure.

FIG. 4 is a flowchart illustrating a method of coupling light between a single mode optical fiber and single polarization first and second grating couplers with a polarization diversity optical interface assembly (e.g., 100, 200a-200e, 300) according to the present disclosure. The method 400 begins at block 460, wherein a single mode optical fiber is coupled to a ferrule. At bock 462, light is emitted from an optoelectronic device through the single mode optical fiber. The light is then passed through a walk-off crystal such that the light is spatially separated into first and second orthogonal polarization modes prior to entering respective single polarization first and second grating couplers disposed on a substrate in block 464. At block 466, the first and second polarization modes are passed through the respective single polarization first and second grating couplers.

In some implementations, the method 400 further includes passing the first and second polarization modes through first and second polarization dependent waveguides coupled to the respective single polarization first and second grating couplers after passing the first and second polarization modes through the respective single polarization first and second grating couplers. In some implementations, the light is passed through the walk-off crystal such that the light is spatially split into the first and second polarization components prior to exiting the ferrule. In some implementations, the method 400 further includes passing the first and second polarization modes through respective first and second light tilting elements to orient the first and second polarization modes to propagate along respective optical axes of the respective single polarization first and second grating couplers. In yet other implementations, the method 400 further includes passing the first and second polarization modes through one or more lenses mounted on the substrate to focus the first and second polarization modes onto the respective single polarization first and second grating couplers.

Optoelectronic devices 112 and 114 such as light emitters, modulators, or photodetectors described herein may include, but are not limited to, vertical cavity surface emitting lasers, distributed feedback lasers, mach-zehnder or ring modulators, or p-i-n or avalanche photodiodes.

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect, between two or more elements; the coupling or connection between the elements can be physical, mechanical, logical, optical, electrical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. A polarization diversity optical interface assembly comprising:
    a single mode optical fiber;
    first and second grating couplers disposed on a substrate, the first and second grating couplers coupled to first and second waveguides, respectively; and
    an optical connector to couple light between the single mode optical fiber and each of the first and second grating couplers, the optical connector comprising a ferrule and a walk-off crystal, the ferrule coupled to a portion of the single mode optical fiber, the walk-off crystal to one or both of spatially separate light from the single mode optical fiber into first and second orthogonal polarization modes prior to passing through the respective first and second grating couplers or combine first and second polarization modes of light from the first and second grating couplers prior to passing through the single mode optical fiber.

2. The polarization diversity optical interface assembly of claim 1, wherein the first and second grating couplers are single polarization grating couplers and the first and second waveguides are polarization dependent waveguides.

3. The polarization diversity optical interface assembly of claim 1, wherein the first and second grating couplers extend orthogonally relative to each other and along a same horizontal plane of the substrate.

4. The polarization diversity optical interface assembly of claim 1, wherein the optical connector is a single mode expanded beam optical connector.

5. The polarization diversity optical interface assembly of claim 1, further comprising one or more optoelectronic devices to one or more of emit, modulate, or detect the light.

6. The polarization diversity optical interface assembly of claim 5, wherein the one or more optoelectronic devices are disposed on or off the substrate.

7. The polarization diversity optical interface assembly of claim 1, wherein the walk-off crystal consists of a single walk-off crystal.

8. The polarization diversity optical interface assembly of claim 1, wherein the walk-off crystal has a thickness from 1 mm to 2.5 mm.

9. The polarization diversity optical interface assembly of claim 1, wherein the optical connector comprises first and second light tilting elements to orient the first and second polarization modes exiting the ferrule to propagate along respective optical axes of the first and second grating couplers.

10. The polarization diversity optical interface assembly of claim 1, further comprising one or more lenses mounted on the substrate to focus the first and second polarization modes exiting the ferrule onto the first and second grating couplers, respectively.

11. The polarization diversity optical interface assembly of claim 1, wherein the walk-off crystal is disposed within the ferrule such that the light is spatially separated into the first and second polarization modes prior to exiting the ferrule and passing through the respective first and second grating couplers.

12. An optical connector to couple light between a single mode optical fiber and single polarization first and second grating couplers, the optical connector comprising:
    a ferrule to couple to a portion of a single mode optical fiber;
    a walk-off crystal in contact with a portion of the ferrule to spatially separate light into first and second orthogonal polarization modes when the light is emitted through the single mode optical fiber from an optoelectronic device coupled to the single mode optical fiber, the first and second orthogonal polarization modes to be passed to the respective single polarization first and second grating couplers; and
    a lens to collimate the light prior to passing through the walk-off crystal when the light is emitted through the single mode optical fiber from the optoelectronic device.

13. The optical connector of claim 12, wherein the walk-off crystal is disposed within the ferrule such that the light is spatially separated into the first and second polarization modes prior to exiting the ferrule.

14. The optical connector of claim 12, further comprising an optical turning element disposed within the ferrule to orient the light at an angle with respect to a crystal optic axis of the walk-off crystal after passing through the lens and prior to passing through the walk-off crystal.

15. The optical connector of claim 12, further comprising first and second light tilting elements to orient the first and second polarization modes exiting the ferrule to propagate along respective optical axes of single polarization first and second grating couplers.

16. A method of coupling light between a single mode optical fiber and single polarization first and second grating couplers, the method comprising:
   coupling a single mode optical fiber to a ferrule;
   emitting light from an optoelectronic device through the single mode optical fiber;
   passing the light through a walk-off crystal such that the light is spatially separated into first and second orthogonal polarization modes prior to entering respective single polarization first and second grating couplers disposed on a substrate; and
   passing the first and second orthogonal polarization modes through the respective single polarization first and second grating couplers after the light is spatially separated into the first and second orthogonal polarization modes by the walk-off crystal.

17. The method of claim 16, further comprising passing the first and second polarization modes through first and second polarization dependent waveguides coupled to the respective single polarization first and second grating couplers after passing the first and second polarization modes through the respective single polarization first and second grating couplers.

18. The method of claim 16, wherein the light is passed through the walk-off crystal such that the light is spatially split into the first and second polarization components prior to exiting the ferrule.

19. The method of claim 16, further comprising passing the first and second polarization modes through respective first and second light tilting elements to orient the first and second polarization modes to propagate along respective optical axes of the respective single polarization first and second grating couplers.

20. The method of claim 16, further comprising passing the first and second polarization modes through one or more lenses mounted on the substrate to focus the first and second polarization modes onto the respective single polarization first and second grating couplers.

* * * * *